(12) United States Patent
Suzuki

(10) Patent No.: US 7,136,226 B2
(45) Date of Patent: Nov. 14, 2006

(54) FRONT TELECONVERTER LENS SYSTEM

(75) Inventor: Kenzaburo Suzuki, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 62 days.

(21) Appl. No.: 10/742,895

(22) Filed: Dec. 23, 2003

(65) Prior Publication Data
US 2005/0018293 A1    Jan. 27, 2005

(30) Foreign Application Priority Data
Dec. 24, 2002   (JP)   ............................ 2002-372479
Dec. 12, 2003   (JP)   ............................ 2003-414150

(51) Int. Cl.
*G02B 5/18*    (2006.01)

(52) U.S. Cl. .................. 359/569; 359/692; 359/748; 359/795

(58) Field of Classification Search ............. 359/569, 359/558, 565, 566, 676, 677, 680, 681, 682, 359/691, 692, 745, 748, 749, 753, 754, 793, 359/795
See application file for complete search history.

(56) References Cited

U.S. PATENT DOCUMENTS 4,171,872 A * 10/1979 Baker ..................... 359/744
6,097,547 A * 8/2000 Ogata et al. ............. 359/673
6,424,465 B1   7/2002 Suzuki ..................... 359/557
6,563,644 B1   5/2003 Suzuki ..................... 359/557

FOREIGN PATENT DOCUMENTS

| JP | 63 210810 | 9/1988 |
| JP | 63-210810 | 9/1988 |
| JP | 2000-171708 | 6/2000 |

OTHER PUBLICATIONS

"Introduction to Diffractive Optical Elements," Supervised by Optical Design Study Group in the Optical Society of Japan, OPTRONICS, 1997.

* cited by examiner

*Primary Examiner*—Thong Nguyen
*Assistant Examiner*—Arnel C. Lavarias
(74) *Attorney, Agent, or Firm*—Miles & Stockbridge PC

(57) ABSTRACT

A front teleconverter lens system having superb optical performance with less production of aberration in spite of its compactness. The front teleconverter lens system includes, in order from an object, a first lens group having positive refractive power, and a second lens group having negative refractive power, and forming an afocal optical system. A diffractive optical surface is arranged in at least one of the first lens group and the second lens group. The conditional expression $1.2 < \phi F/\phi R < 10$ is satisfied, where $\phi F$ denotes the effective diameter of the most object side lens surface of the first lens group, and $\phi R$ denotes the effective diameter of the most image side lens surface of the second lens group.

26 Claims, 9 Drawing Sheets

FRONT TELECONVERTER LENS SYSTEM

INCORPORATION BY REFERENCE

The disclosures of the following priority applications are herein incorporated by reference:

Japanese Patent Application No. 2002-372479 filed Dec. 24, 2002, and

Japanese Patent Application No. 2003-414150 filed Dec. 12, 2003.

BACKGROUND OF THE INVENTION

1. Field of the Invention

The present invention relates to a front teleconverter lens system for varying the focal length of a whole lens system to the longer side by attaching to the object side of an imaging lens.

2. Description of Related Art

A front teleconverter that is attached to the object side of an imaging lens for varying the focal length of the whole lens system to the longer side has been known to be used for a still camera, a video camera, and the like. Generally, this kind of front teleconverter is composed of, in order from the object, a first lens group having positive refractive power, and a second lens group having negative refractive power, where the focal points of respective lens groups are arranged to substantially coincide with each other forming an afocal lens system that collimated light incident to the object side exits as collimated light. An example of the conventional front teleconverter lens system that is composed of, in order from the object, a single positive lens having positive refractive power and a single negative lens having negative refractive power is disclosed in Japanese Laid-Open Patent Application No. 63-210810. The construction of the lens is relatively simple.

Although the conventional front teleconverter lens system disclosed in the above-described document can be compact and lightweight with fewer lens and simple construction, aberration becomes slightly large, so that optical performance is not sufficient.

SUMMARY OF THE INVENTION

The present invention is made in view of the aforementioned problems and has an object to provide a front teleconverter lens system in spite of its compact configuration having superb optical performance with sufficiently suppressing production of aberration.

According to one aspect of the present invention, a front teleconverter lens system having three lenses or more, and an afocal magnification, upon attaching to an imaging lens, of 1.4 or more, and forming an afocal optical system, the front teleconverter lens system includes, in order from an object, a first lens group having positive refractive power, and a second lens group having negative refractive power. A diffractive optical surface being arranged in at least one of the first lens group and the second lens group. The following conditional expression (1) is satisfied:

$$1.2 < \phi F/\phi R < 10 \quad (1)$$

where $\phi F$ denotes the effective diameter of the most object side lens surface of the first lens group, and $\phi R$ denotes the effective diameter of the most image side lens surface of the second lens group.

In one preferred embodiment of the present invention, the first lens group includes at least one pair of a convex surface and a concave surface adjacent with each other and the following conditional expression (2) is satisfied:

$$-3.0 < |Pd/Ps| < -0.05 \quad (2)$$

where Ps denotes a combined refractive power of the convex surface and the concave surface of the pair, and Pd denotes a refractive power of the diffractive optical surface.

In one preferred embodiment of the present invention, the pair of a convex surface and a concave surface adjacent with each other have an air space there between.

In one preferred embodiment of the present invention, the pair of a convex surface and a concave surface adjacent with each other form a single cemented surface.

In one preferred embodiment of the present invention, an incident angle of the principal ray passing through the maximum image height to the diffractive optical surface is preferably 15 degrees or less.

In one preferred embodiment of the present invention, the first lens group has a biconvex lens and at least one negative lens, and the second lens group has a biconcave lens at the most image side. The following conditional expression (3) is satisfied:

$$0.03 < \phi R/fd < 1.0 \quad (3)$$

where fd denotes the focal length of a lens on which the diffractive optical surface is formed.

In one preferred embodiment of the present invention, the diffractive optical surface is arranged on one of the lens surface in the first lens group, and the following conditional expression (4) is preferably satisfied:

$$1.0 < fF/DFR < 10.0 \quad (4)$$

where fF denotes the focal length of the first lens group, and DFR denotes a distance along the optical axis between the first lens group and the second lens group.

In one preferred embodiment of the present invention, the following conditional expression (5) is preferably satisfied:

$$1.0 < fd/L < 10.0 \quad (5)$$

where fd denotes the focal length of a lens on which the diffractive optical surface is formed, and L denotes a distance between the most object side lens surface of the first lens group and the most image side lens surface of the second lens group.

According to another aspect of the present invention, a front teleconverter lens system having three lenses or more, and an afocal magnification, upon attaching to an imaging lens, of 1.4 or more, and forming an afocal optical system, the front teleconverter lens system includes, in order from an object, a first lens group having positive refractive power, and a second lens group having negative refractive power. A diffractive optical surface is arranged in at least one of the first lens group and the second lens group. The first lens group includes at least one pair of a convex surface and a concave surface adjacent with each other, and the following conditional expression (2) is satisfied:

$$-3.0 < |Pd/Ps| < -0.05 \quad (2)$$

where Ps denotes a combined refractive power of the convex surface and the concave surface of the pair, and Pd denotes a refractive power of the diffractive optical surface.

DESCRIPTION OF THE PREFERRED EMBODIMENTS

Figure 1:
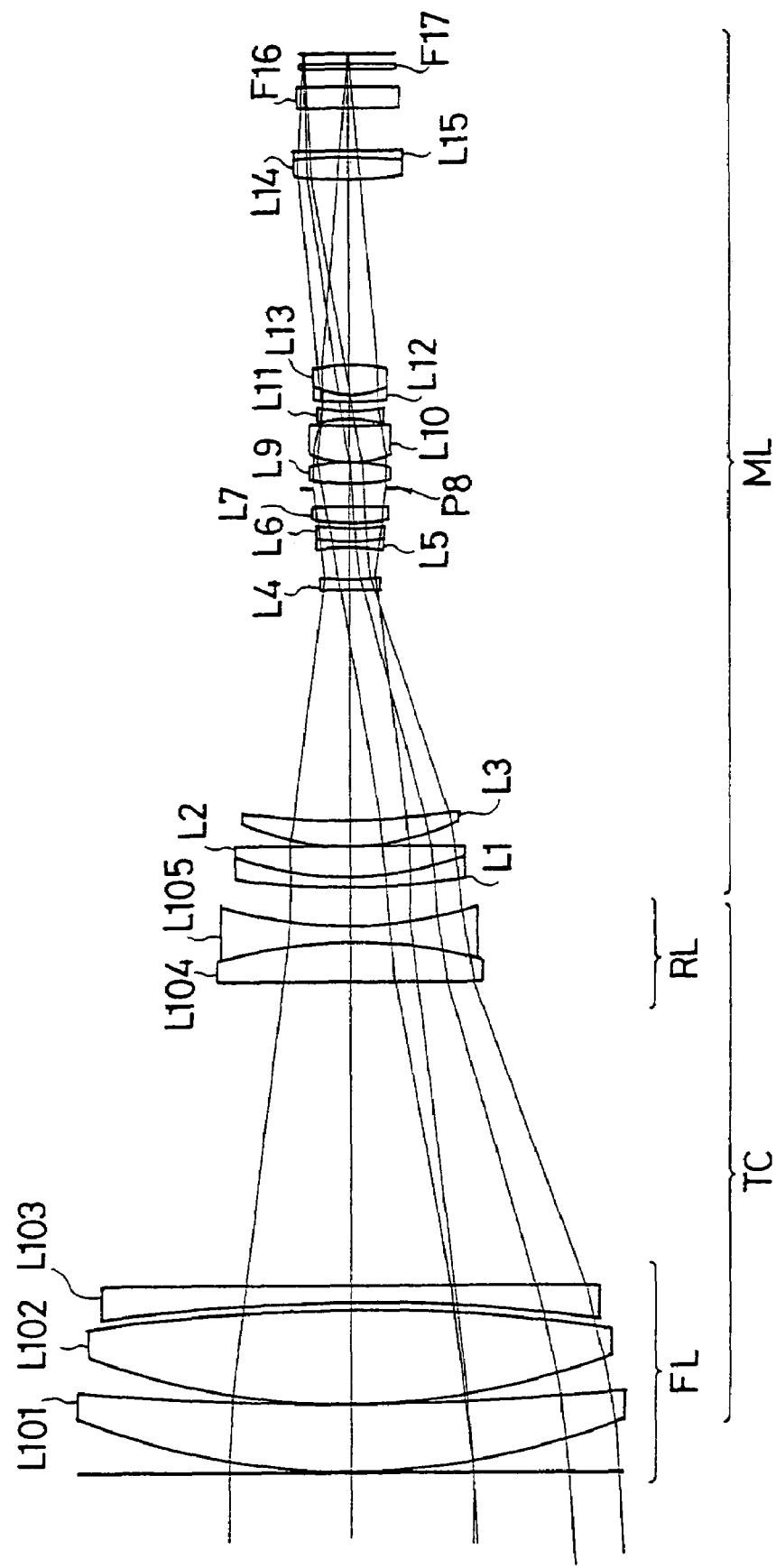
FIG. 1 is a diagram showing a combined optical system constructed by a front teleconverter lens system combined with an imaging lens according to Example 1 of the present invention.

Preferred embodiments of a front teleconverter lens system according to the present invention is explained below. The front teleconverter lens system is a kind of a teleconverter used by arranging in front of any imaging lens, so the optical configuration of the front teleconverter lens system is explained first. As described above the front teleconverter lens system is arranged to the image side of any imaging lens (for example, a shooting lens) and is an afocal optical system that exits collimated light beam from the image side surface when collimated light beam is incident to the object side surface. In this case, an afocal magnification M of the front teleconverter relates to the ratio of an inclination angle of paraxial ray in the exit side to that in incident side, that is $|\theta_{out}/\theta_{in}|$, where $\theta_{out}$ denotes an inclination angle of paraxial ray relative to the optical axis in exit side and $\theta_{in}$ denotes an inclination angle of paraxial ray relative to the optical axis in incident side. The front teleconverter lens system is a kind of front converter that converts the focal length of the combined lens system to a longer side and has an afocal magnification M larger than one (in other words, has a function of making the focal length longer.) However, in the front teleconverter according to the present invention, the afocal magnification M is larger than 1.4 as described below.

In the optical system forming the front teleconverter, a Kepler type and a Galilean type have been known. The Galilean type optical system has a lens configuration composed of, in order from the object, a first lens group having positive refractive power and a second lens group having negative refractive power, in which the image side focal point of the first lens group and the object side focal point of the second lens group coincide with each other. Consequently, a bundle of parallel light incident from the object side exits from image side as a bundle of parallel light with decreasing its diameter after passing through the front teleconverter. Accordingly, the teleconverter lens is called an afocal converter and the afocal magnification M of the Galilean type front teleconverter is defined by the following expression (a):

$$M = |fF/fR| \qquad (a)$$

where fF denotes the focal length of the first lens group, and fR denotes the focal length of the second lens group. Here, even if the image side focal point of the first lens group and the object side focal point of the second lens group do not coincide with each other, the afocal magnification M is defined as the ratio of the inclination angle of paraxial ray in exit side $\theta_{out}$ to that in incide side $\theta_{in}$, that is $M=|\theta_{out}/\theta_{in}|$. The M value is derived by paraxial ray trace calculation of the lens data part of the front teleconverter lens system. In other words, the afocal magnification of the front teleconverter is determined from parameters of each lens of the front teleconverter regardless of the imaging lens. Practically, the image side focal position of the first lens group and the object side focal position of the second lens group are not necessary to closely coincide with each other. At least one of the first lens group and the second lens group is moved along the optical axis for focusing, or these focal positions may be located close within a range capable of focusing by the rear lens (imaging lens). Even if these focal positions do not coincide rigorously, the afocal magnification is to be thought as the ratio of the inclination angle of the paraxial ray in the exit side to that in the incident side. In this case, the afocal magnification varies from the expression (a), but the varying amount is trifling. When these focal positions rigorously coincide with each other, the focal length of the combined lens system composed of the front teleconverter lens system and the imaging lens (whose focal length is to be f) locating to the image side of the front teleconverter lens system is given by M×f. On the other hand, when these focal positions do not coincide with each other, the focal length of the combined lens system somewhat varies from the value M×f. The focal length of the combined optical system (the front teleconverter lens system and the imaging lens) can be calculated by paraxial ray trace calculation.

In the front teleconverter lens system, there is a Kepler type composed of two positive lens groups. However, in order to shorten the total lens length of the front teleconverter, Galilean type is desirable. Moreover, since the image does not rotate when the front teleconverter is attached to the imaging lens, Galilean type front teleconverter lens system is desirable for attaching to an imaging lens of a camera. However, in an additional optical system like the front teleconverter lens system, when aberrations are not corrected sufficiently by itself, optical performance of the combined optical system (composed of the front teleconverter and the imaging lens) is degraded, so you must be careful. In the Galilean type front teleconverter lens system, the present invention found a way to obtain superior optical performance in spite of its compactness with sufficiently suppressing production of aberration by using a diffractive optical element.

Then, a diffractive optical element is explained. Refraction and reflection are generally known as the way to deflect a light ray. There is diffraction as the third way. Diffraction grating and Fresnel zone plate are optical elements using the diffraction effect of the light. A diffractive optical element is known to behave differently from refraction or reflection, and in particular has a negative value of dispersion. This characteristic is extremely effective to correct chromatic aberration making it possible to obtain superb chromatic aberration correction which cannot be accomplished (by ordinary glass) unless utilizing expensive extra low dispersion glass.

Figure 9A:
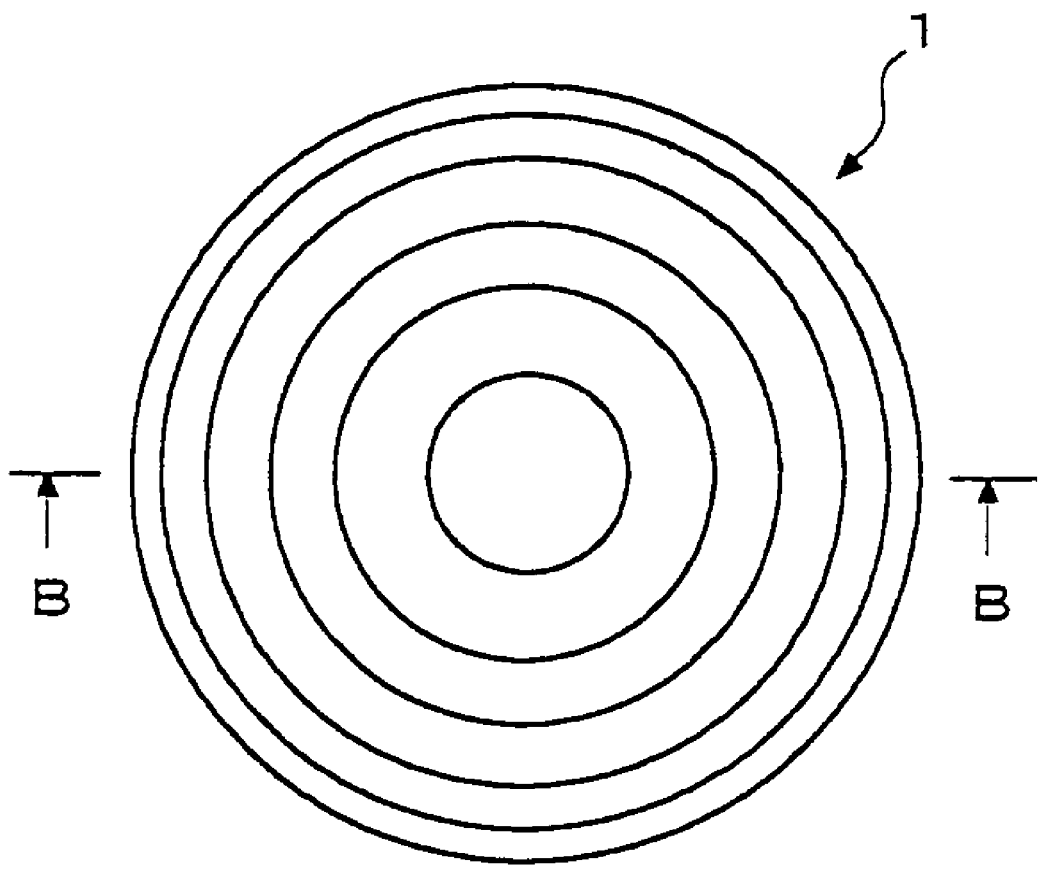
FIG. 9A is a plan view of an example of a Fresnel zone plate.
Figure 9B:
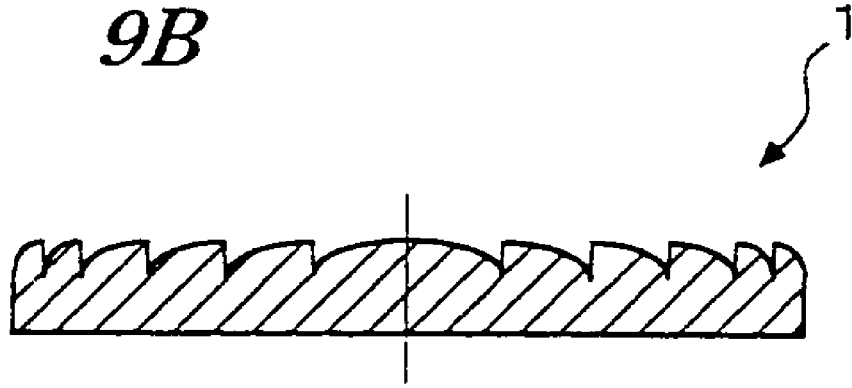
FIG. 9B is a cross sectional view of FIG. 9A sectioned by B—B line.

In the present invention, a diffractive optics, in other words a diffraction grating or a Fresnel zone plate for deflecting a light ray producing diffraction effect, is formed on an optical surface made of glass or plastic to obtain superb optical performance. FIG. 9 is an example of a Fresnel zone plate. FIG. 9A is a plan view of the example of a Fresnel zone plate looked from the optical axis. FIG. 9B is a cross sectional view of the Fresnel zone plate of FIG. 9A sectioned by B—B line. The Fresnel zone plate shown in FIG. 9 is a Kinoform type that has continuous curvature on each pitch surface of the diffraction grating forming the diffractive optical surface. By the way, these diffractive optical elements are shown in detail in "*Introduction to Diffractive Optical Elements*", supervised by The Optical Society of Japan, (OPTRONICS, 1997).

Then, the front teleconverter lens system according to the present invention is going be explained in detail. The front teleconverter lens system according to the present invention includes, in order from the object, a first lens group having positive refractive power and a second lens group having negative refractive power forming an afocal optical system. A diffraction optical surface is formed at least one of the first lens group and the second lens group, in other words, a diffractive optical element on which a diffractive optical surface is formed is included. The following conditional expression (1) is satisfied and each optical element is set so as to obtain an afocal magnification larger than 1.4:

$$1.2 < \phi F/\phi R < 10 \quad (1)$$

where $\phi F$ denotes the effective diameter of the most object side lens surface of the first lens group and $\phi R$ denote the effective diameter of the most image side lens surface of the second lens group.

Conditional expression (1) defines an appropriate range of the ratio of the effective diameter of the first lens group being the front lens group to that of the second lens group being the rear lens group of the front teleconverter lens system and is important for selectively transmitting a light bundle necessary to obtain sufficient optical performance.

When the ratio $\phi F/\phi R$ equal to or exceeds the upper limit of conditional expression (1), the effective diameter $\phi F$ of the most object side lens surface of the first lens group becomes excessively large, in other words, the height of ray passing through the first lens group becomes so high producing large amount of aberration, so that it is wrong. In addition, stray light tends to sneak into the optical system causing ghost and flare. Moreover, the diameter of the front lens (the diameter of the lens locating to the most object side) becomes large, so that not only the optical system becomes bulky, but also total weight of the front teleconverter increases.

On the other hand, when the ratio $\phi F/\phi R$ equal to or falls below the lower limit of conditional expression (1), the effective diameter $\phi F$ of the most object side lens surface of the first lens group becomes excessively small, so the peripheral quantity of light cannot be secured sufficiently. In order to bring the effect of the present invention into full play, it is preferable to set the upper limit of conditional expression (1) to 4.0 and even more preferably to 2.5. The lower limit is preferably set to 1.7.

In the front teleconverter lens system according to the present invention, a diffractive optical surface is arranged at least one of the first lens group and the second lens group, and the above-described conditional expression (1) is satisfied, so that various aberrations can satisfactory be corrected by the fewer number of lens. Accordingly, the front teleconverter lens system according to the present invention makes it to obtain superb optical performance in spite of compact lens construction. In order to obtain superb optical performance, it is desirable that the front teleconverter lens system has at least three lenses as a whole. In this case, it is effective to correct coma when the first lens group has two lenses. It is effective to correct various aberrations when the second lens group has two lenses.

In the front teleconverter lens system according to the present invention, the first lens group includes at least one pair of a convex surface and a concave surface adjacent with each other and the following conditional expression (2) is preferably satisfied:

$$-3.0 < |Pd|/Ps < -0.05 \quad (2)$$

where Ps denotes a combined refractive power (a reciprocal of the combined focal length) of the convex surface and the concave surface of the pair, and Pd denotes a refractive power (a reciprocal of the focal length) of the diffractive optical surface.

Conditional expression (2) defines an appropriate range of the refractive power distribution of the refractive power (a reciprocal of the focal length) Pd of the diffractive optical surface relative to the combined refractive power (a reciprocal of the combined focal length) Ps of the convex surface and the concave surface of the pair adjacent with each other in order to correct chromatic aberration. Conditional expression (2) is important for preferably correcting chromatic aberration. When the ratio |Pd|/Ps is in the scope of conditional expression (2) regardless of the sign of the refractive power Pd, preferable correction of chromatic aberration can be obtained. When the ratio |Pd|/Ps is out of the scope of conditional expression (2), on-axis chromatic aberration balance cannot be secured preferably, so that superb optical performance cannot be obtained. When the ratio |Pd|/Ps is equal to or falls below the lower limit of conditional expression (2), the refractive power of the diffractive optical surface becomes too strong causing over correction or under correction of on-axis chromatic aberration, so that preferable correction of chromatic aberration cannot be accomplished. On the other hand, when the ratio |Pd|/Ps is equal to or exceeds the upper limit of conditional expression (2), the refractive power of the diffractive optical surface becomes too weak causing decrease in the effect of the diffractive optical surface, so that preferable correction of chromatic aberration cannot be accomplished.

Moreover, it is preferable that the pair of a convex surface and a concave surface adjacent with each other have an air space there between. Furthermore, it is preferable that the pair of a convex surface and a concave surface adjacent with each other form a single cemented surface.

In the front teleconverter lens system according to the present invention, it is preferable that the angle to incident to the diffractive optical element is as small as possible like general optical systems having a diffractive optical surface. This is because when the incident angle becomes large, flare tends to be produced on the diffractive optical surface to degrade optical performance. Accordingly, in the front teleconverter lens system according to the present invention, in order to suppress the effect of flare to obtain superb optical performance, the incident angle of the principal ray reaching the maximum image height to the diffractive optical surface should be 15 degrees or less, or more preferably, 10 degrees or less. In other words, it is desirable that the diffractive optical surface is formed on the lens surface on which light is incident with the angle of 15 degrees or less (more preferably 10 degrees or less.) Although the diffractive optical surface can be formed on any lens surface as long as these conditions are satisfied, these conditions can be easily satisfied when it is formed on any one surface of a lens having a convex surface facing to the object among the lens surfaces composing the front teleconverter.

In the front teleconverter lens system according to the present invention, the first lens group has a biconvex lens and at least one negative lens, the second lens group has a biconcave lens to the most image side, and when the first lens group has a diffractive optical surface, the following conditional expression (3) is preferably satisfied:

$$0.03 < \phi R/fd < 1.0 \quad (3)$$

where $\phi R$ denotes the effective diameter of the most object side lens of the second lens group, and fd denotes the focal length of the lens on which a diffractive optical surface is formed (in case the lens is a cemented lens, the focal length of the cemented lens.) Conditional expression (3) defines an appropriate range of the ratio of the effective diameter of the most object side lens of the second lens group $\phi R$ to the aforementioned focal length fd. When the ratio $\phi R$/fd equals to or exceeds the upper limit of conditional expression (3), the focal length of the lens on which the diffractive optical surface is formed becomes too small to maintain aberration balance. In particular, it becomes difficult to correct curvature of field, so it is not desirable. Moreover, decentering sensitivity upon assembling the first lens group into the lens barrel increases excessively, so it tends to bring about stray light causing a ghost and a flare. In order to bring the effect of the present invention into full play, it is preferable to set the upper limit of conditional expression (3) to 0.4. The lower limit is preferably set to 0.1.

In the front teleconverter according to the present invention, when the first lens group has a diffractive optical surface, the ratio fF/DFR of the focal length of the first lens group fF to a distance along the optical axis between the first lens group and the second lens group DFR preferably satisfies the following conditional expression (4):

$$1.0 < fF/DFR < 10.0 \quad (4)$$

When the ratio fF/DFR equal to or exceeds the upper limit of conditional expression (4), the focal length fF becomes extremely large, so that the total lens length of the front teleconverter becomes large and spherical aberration and axial chromatic aberration become large. Moreover, the diameter of the front lens tends to become large, so the optical system becomes large as well as the weight becomes heavy. Therefore, it is not desirable. On the other hand, when the ratio fF/DER equal to or falls below the lower limit of conditional expression (4), the focal length fF of the first lens group becomes extremely small, so not only curvature of field becomes large, but also coma of the lower light ray than the principal ray becomes large to degrade optical performance. Moreover, the distance along the optical axis between the first lens group and the second lens group tends to become large, so that the total lens length of the front teleconverter according to the present invention becomes large. Therefore, it is undesirable. In order to bring the effect of the present invention into full play, it is preferable to set the upper limit of conditional expression (4) to 5.0. The lower limit is preferably set to 2.0.

In the front teleconverter according to the present invention, the following conditional expression (5) is preferably satisfied:

$$1.0 < fd/L < 10.0 \quad (5)$$

where fd denotes the focal length of the lens on which a diffractive optical surface is formed, and L denotes the distance between the most object side lens surface of the first lens group and the most image side lens surface of the second lens group.

Conditional expression (5) defines an appropriate range of the ratio of the focal length of the lens on which a diffractive optical surface is formed to the total lens length L of the front teleconverter lens system. When the ratio fd/L is equal to or exceeds the upper limit of conditional expression (5), the focal length fd of the lens on which a diffractive optical surface is formed becomes extremely large to lose aberration balance (in particular, it becomes difficult to correct curvature of field.) Moreover, it tends to happen that the radius of curvature of the lens becomes too small to manufacture. On the other hand, when the ratio fd/L is equal to or falls below the lower limit of conditional expression (5), the focal length fd of the lens on which a diffractive optical surface is formed becomes extremely small, so that the total lens length L of the front teleconverter lens system becomes extremely long making it difficult to be compact. In addition, the ability for correcting chromatic aberration becomes insufficient so it becomes difficult to correct chromatic aberration sufficiently. In order to bring the effect of the present invention into full play, it is preferable to set the upper limit of conditional expression (5) to 3.5. The lower limit is preferably set to 2.0.

In addition to aforementioned lens configuration, the front teleconverter according to the present invention preferably satisfies the following conditional expression (6):

$$1.8 < nd \quad (6)$$

where nd denotes the refractive index of the biconcave lens in the second lens group at d-line.

When the refractive index nd is equal to or falls below the lower limit of conditional expression (6), Petzval sum of the whole lens system tends to become negative. Accordingly, curvature of field is bent largely to positive direction degrading optical performance on the periphery of the image frame, so it is undesirable.

When the front teleconverter according to the present invention is actually designed, in order to obtain satisfactory optical performance, a biconvex lens and a negative lens are preferably included in the first lens group. Moreover, in order to correct chromatic aberration sufficiently, the first lens group preferably includes at least one positive lens made of low dispersion glass. In particular, the first lens group preferably includes at least one positive lens made of an optical glass material having Abbe number of 65 or more. This construction makes it possible to correct lateral chromatic aberration as well as axial chromatic aberration, so superb optical performance can be obtained. In order to bring the effect of the present invention into full play, the first lens group preferably includes at least one positive lens made of an optical glass material having Abbe number of 80 or more. In order to obtain more preferable optical performance, the negative lens preferably has Abbe number of 35 or less.

On the other hand, the second lens group preferably composed of a cemented lens constructed by, in order from the object, a positive meniscus lens cemented with a biconcave lens. Moreover, in order to correct spherical aberration in particular among various aberrations, the second lens group preferably includes a positive lens having a convex surface facing to the image, so that preferable optical performance can be obtained. This is because although production of axial chromatic aberration, in particular, among various aberrations becomes large as increasing the afocal magnification, preferable chromatic aberration balance can be accomplished by constructing lens as described above.

When the above-described diffractive optical surface is formed on a lens surface, in order to make it easy to manufacture, the diffractive optical surface preferably has a grating configuration rotationally symmetrical with the optical axis such as a Fresnel zone plate. The grating configuration can be manufactured as manufacturing an ordinary aspherical surface by means of fine grinding or glass molding. Moreover, a thin resin layer is formed on the lens surface, and the grating configuration may be formed on the resin layer. Furthermore, the diffraction grating is not limited to a simple single structure, it may be multi layered structure accumulating a plurality of single layers. By means of a multi-layered-structure diffraction grating, spectral characteristic and angular characteristic of diffraction efficiency can be much more improved.

The diffractive optical surface is preferably formed on the lens made of an optical glass having Abbe number of 65 or less. This is because the diffraction grating can be formed easier and better optical performance can be obtained.

Incidentally, the front teleconverter lens system according to the present invention can be attached to the object side of any imaging lens (photographic lens). When the front teleconverter lens system according to the present invention is attached to the object side of the imaging lens, the closest focusing distance of the whole lens system becomes longer than that of the imaging lens itself. However, by arranging a moving mechanism along the optical axis to at least one of the first and second lens groups, focusing to a close object becomes possible, so that focusing does not become any problem. In the front teleconverter lens system according to the present invention, by constructing the second lens group to be moved along the optical axis, relatively simple configuration can be adopted. By using the configuration, an internal focusing type that performs focusing without varying the total lens length can be adopted.

The front teleconverter lens system according to the present invention can be constructed as a vibration reduction control lens system that is combined with a vibration detector for detecting vibration of an imaging lens, a vibration controller for determining an appropriate vibration correction amount on the basis of a signal from the vibration detector and a controller for controlling a sequence of a camera movement, and a driver for moving the vibration reduction lens group on the basis of the vibration correction amount determined by the vibration controller. In this case, it is preferable that the vibration reduction lens group is to be the second lens group, which is relatively compact, or a portion of the second lens group constructing to be shifted perpendicular to the optical axis. It is needless to say that the further preferable optical performance can be obtained by using an aspherical lens, a graded index lens, and the like in addition to respective lenses composing the front teleconverter lens system according to the present invention.

Each Example of the front teleconverter lens system according to the present invention is explained below with reference to accompanying drawings.

Figure 5:
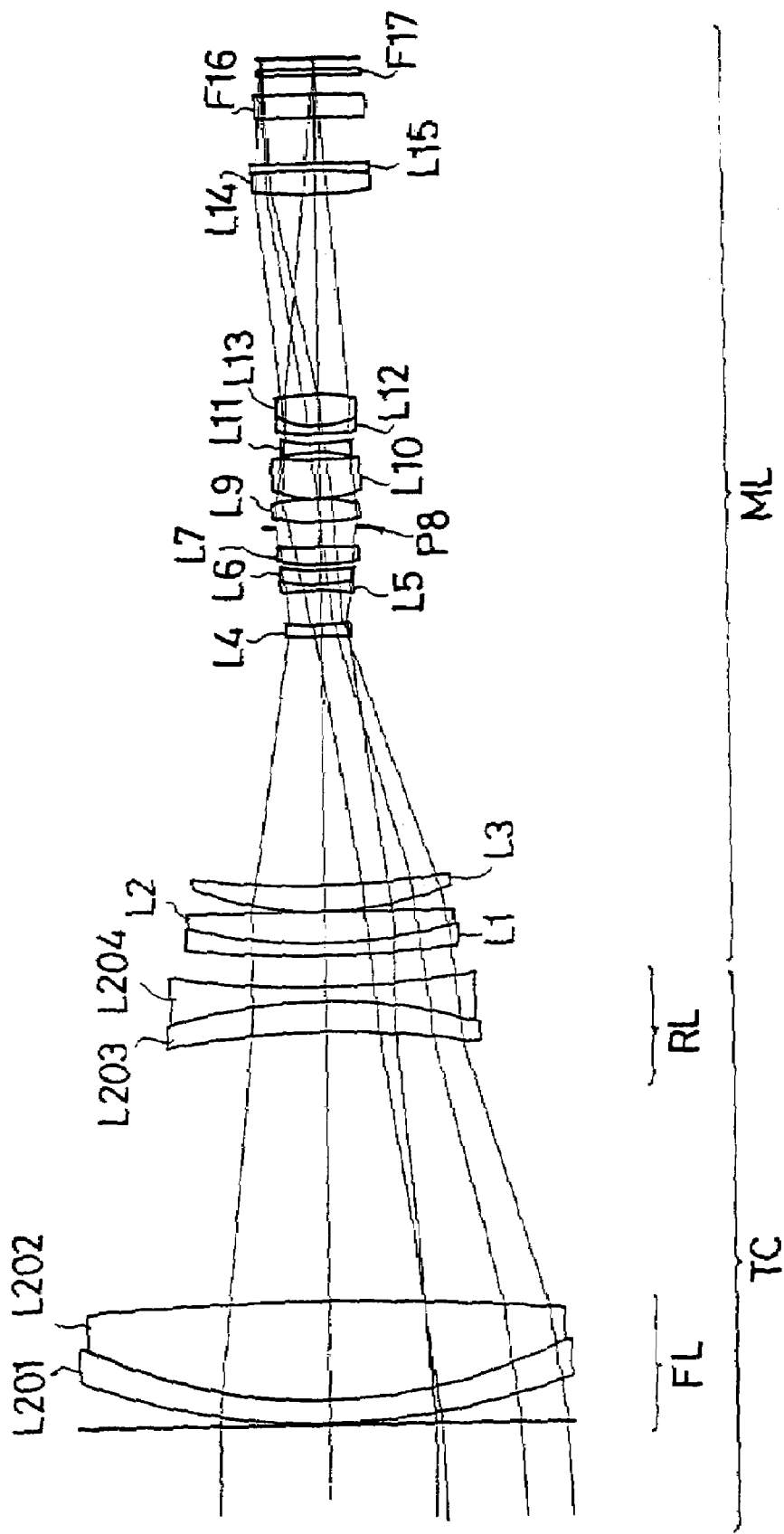
FIG. 5 is a diagram showing a combined optical system constructed by a front teleconverter lens system combined with the imaging lens according to Example 2 of the present invention.

In two Examples explained below, the front teleconverter lens system TC according to the present invention is composed of a first lens group FL arranged to the object side having positive refractive power and a second lens group RL arranged to the image side having negative refractive power (an afocal magnification is to be 1.4 or more), and a photographic lens ML as an imaging lens is arranged to the image side of the second lens group RL as shown in FIGS. 1 and 5. In both Examples, the lens on which a diffractive optical surface is formed is positioned in the first lens group FL.

In each Example, the phase difference is calculated by means of an ordinary refractive index and a ultra-high index method that uses aspherical expressions (7) and (8) mentioned later. The ultra-high index method uses definite equivalence between the aspherical expression and the grating pitch of the diffractive optical surface. In each Example, the diffractive optical surface is represented as data of the ultra-high index method, in other words, coefficients of aspherical expressions (7) and (8). In each Example, aberration calculation is carried out at d-line, g-line, C-line, and F-line. The wavelength and the particular value of refractive index set relative to each spectral line, d-line, g-line, C-line, and F-line, are shown in Table 1.

TABLE 1

| | wave length | refractive index |
|---|---|---|
| d-line | 587.562 nm | 10001.0000 |
| g-line | 435.835 | 7418.6853 |
| C-line | 656.273 | 11170.4255 |
| F-line | 486.133 | 8274.7311 |

In each Example, an aspherical surface is represented by the following expressions (7) and (8):

$$Z(y)=(y^2/r)/(1+(1-\kappa(y^2/r^2))^{1/2})+C_2y^2+C_4y^4+C_6y^6+C_8y^8+C_{10}y^{10} \quad (7)$$

$$R=1/((1/r)+2C_2) \quad (8)$$

where y denotes ray height (incident height) perpendicular to the optical axis, Z(y) denotes sag amount that is the distance along the optical axis between tangent plane at the vertex of the aspherical surface and the aspherical surface at height y, r denotes a reference radius of curvature, R denotes a paraxial radius of curvature, κ denotes the conical coefficient, $C_2$ denotes the second order aspherical coefficient, $C_4$ denotes the 4th order aspherical coefficient, $C_6$ denotes the 6th order aspherical coefficient, $C_8$ denotes the 8th order aspherical coefficient, $C_{10}$ denotes the 10th order aspherical coefficient.

Incidentally, the ultra-high index method used in each Example of the present invention is shown in detail in the aforementioned "*Introduction to Diffractive Optical Elements*", supervised by The Optical Society of Japan, (OP-TRONICS, 1997).

Example 1

Figure 2:
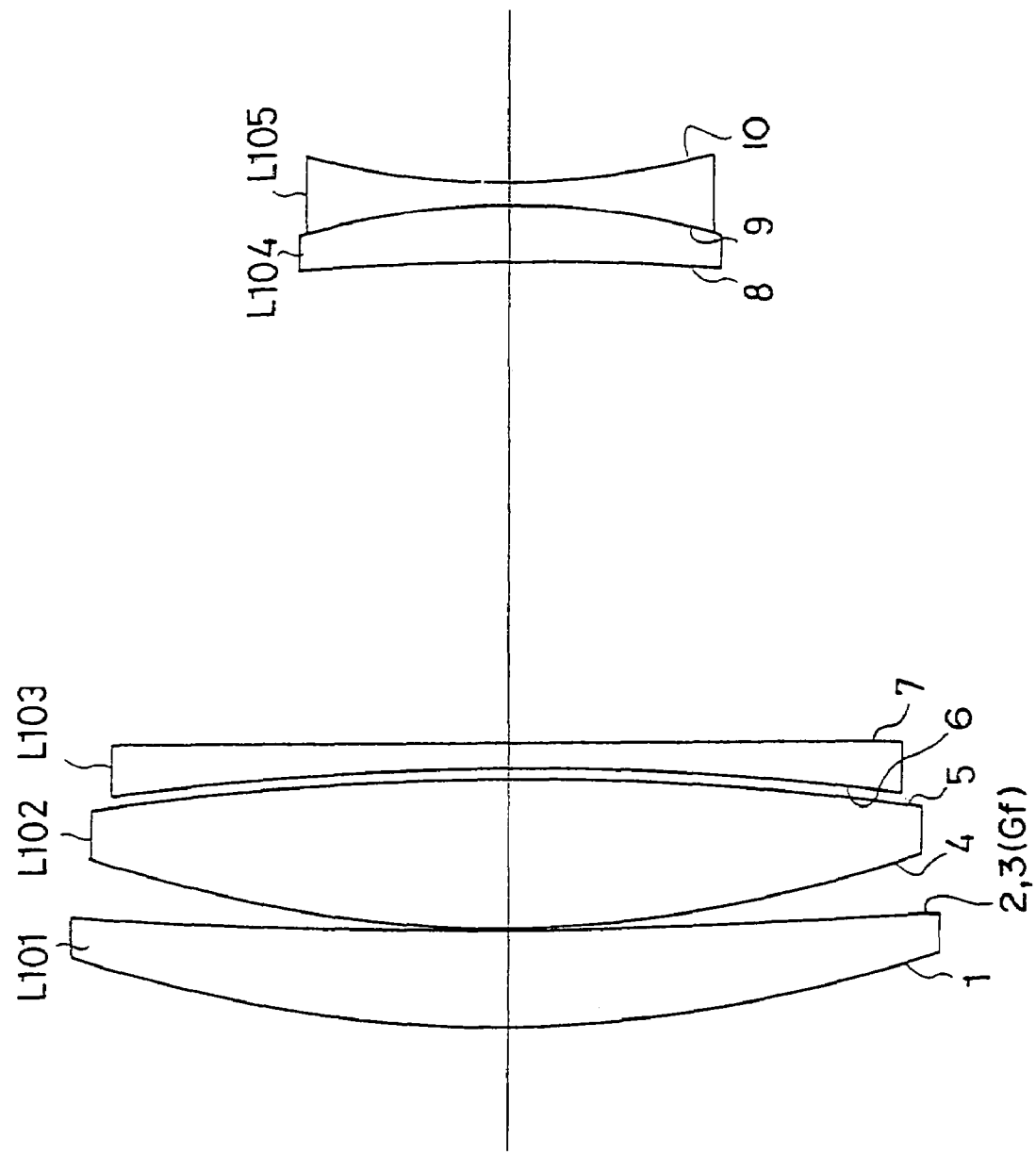
FIG. 2 is a diagram showing the front teleconverter lens system of the combined optical system according to Example 1 of the present invention.
Figure 3:
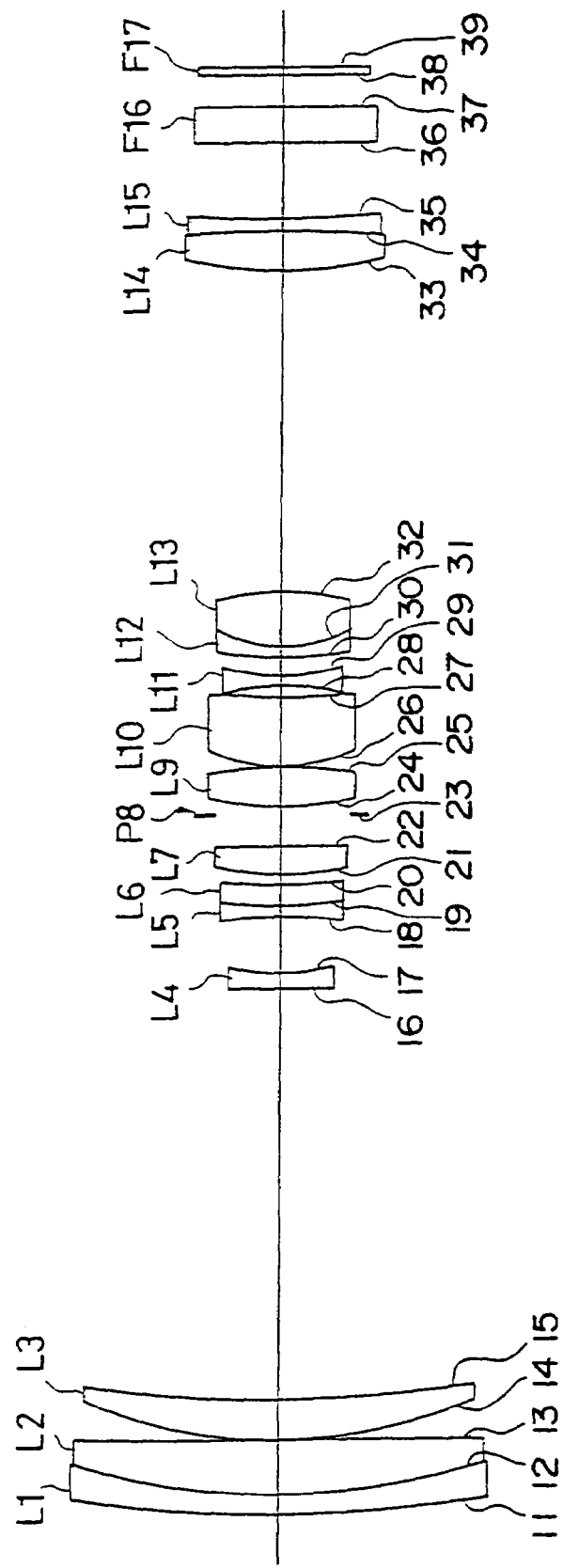
FIG. 3 is a diagram showing the imaging lens of the combined optical system according to Examples 1 and 2 of the present invention.

FIG. 1 is a diagram showing a combined optical system constructed by a front teleconverter lens system combined with an imaging lens according to Example 1 of the present invention. FIG. 2 is a diagram showing the front teleconverter lens system of the combined optical system. FIG. 3 is a diagram showing the imaging lens of the combined optical system. As shown in FIGS. 1 and 3, the imaging lens ML used in the combined optical system according to Example 1 is composed of, in order from an object, a cemented positive lens constructed by a negative meniscus lens L1 having a convex surface facing to the object cemented with a biconvex positive lens L2, a positive meniscus lens L3 having a convex surface facing to the object, a negative meniscus lens L4 having a convex surface facing to the object, a cemented negative lens constructed by a biconcave negative lens L5 cemented with a positive meniscus lens L6 having a convex surface facing to the object, a positive meniscus lens L7 having a convex surface facing to the object, an aperture stop P8, a biconvex positive lens L9, a positive meniscus lens L10 having a convex surface facing to the object, a biconcave negative lens L11, a cemented positive lens constructed by a negative meniscus lens L12 having a convex surface facing to the object cemented with a biconvex positive lens L13, a cemented positive lens constructed by a biconvex positive lens L14 cemented with a biconcave negative lens L15, and two filters F16 and F17 each composed of a plane parallel glass.

As shown in FIGS. 1 and 2, the front teleconverter lens system TC according to Example 1 is composed of a first lens group FL having positive refractive power and a second lens group RL having negative refractive power. The first lens group FL is composed of, in order from the object, a positive meniscus lens L101 on the image side surface of which a diffractive optical surface is formed having a convex surface facing to the object, a biconvex positive lens L102, and a negative meniscus lens L103 having a concave surface facing to the object. The second lens group RL is composed of, in order from the object, a cemented negative lens constructed by a positive meniscus lens L104 having a concave surface facing to the object cemented with a biconcave negative lens L105. The image side surface (convex surface) of the biconvex lens L102 and the object side surface (concave surface) of the negative meniscus lens L103 form a pair of a convex surface and a concave surface adjacent with each other with an air space there between.

Various values associated with Example 1 are listed in Table 2. The left most column of [Lens Data] in Table 2 is the surface number. Surface number 1 through 10 in Table 2 relate to the front teleconverter lens system TC corresponding to each reference number 1 through 10 in FIG. 2. Surface Number 11 through 39 relate to the imaging lens ML corresponding to each reference number 11 through 39 in FIG. 3. In Table 2, "r" denotes a radius of curvature of a lens surface (a radius of curvature of at the vertex in the case of an aspherical surface), "d" denotes a distance to an adjacent lens surface, "n(d)" denotes refractive index at d-line, "n(g)" denotes refractive index at g-line, "n(C)" denotes refractive index at C-line, "n(F)" denotes refractive index at F-line. In Table 2, an aspherical surface is expressed with "*" attached to the right side of the surface number. In aspherical coefficients $C_n$ (n=2, 4, 6, 8, 10), "E-09" or the like denotes "$\times 10^{-09}$". The explanation of the notation in Table 2 is to be applied to the following Examples.

In Example 1, surface numbers 2 and 3 of the front teleconverter lens system TC correspond to diffractive optical surfaces Gf. Accordingly, the lens L101 is the lens on which diffractive optical surface is formed (diffractive optical element). The glass material of the lens L101 on which diffractive optical surface is formed has Abbe number of 23.8. The most object side lens surface of the first lens group FL corresponds to the object side surface (surface number 1) of the lens L101 and the effective diameter of the surface corresponds to φF in conditional expression (1). The most image side lens surface of the second lens group RL corresponds to the image side surface (surface number 10) of the lens L105 and the effective diameter of the surface corresponds to φR in conditional expressions (1) and (3).

Figure 8:
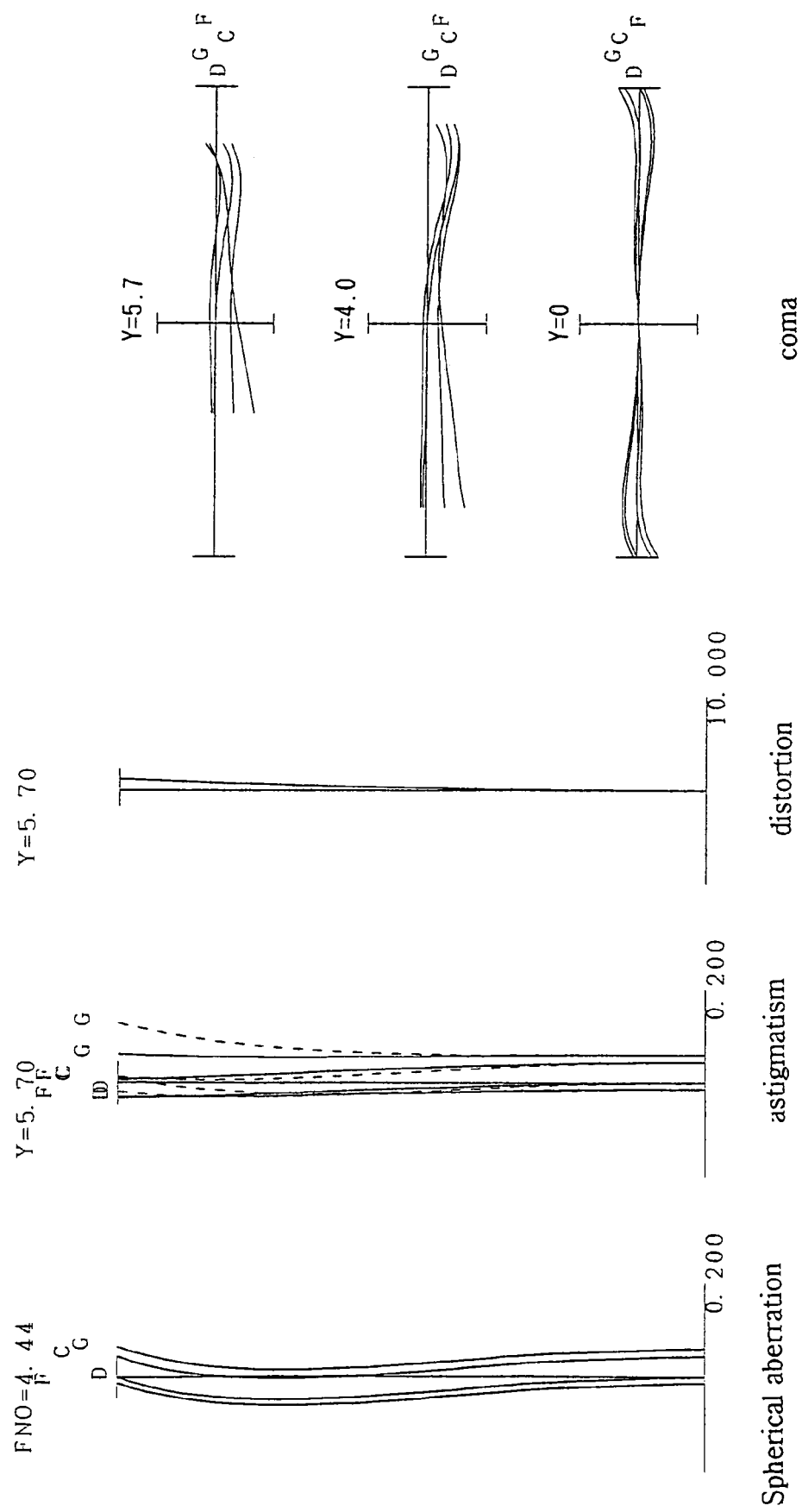
FIG. 8 graphically shows various aberrations of the imaging lens according to Examples 1 and 2 of the present invention.

FIG. 8 graphically shows various aberrations of the imaging lens according to Examples 1 and 2 of the present invention. As is apparent from the graphs, the imaging lens ML before applying the front teleconverter lens system shows superb optical performance as a result of good corrections to various aberrations.

TABLE 2

| | r | d | n(d) | n(g) | n(C) | n(F) |
|---|---|---|---|---|---|---|
| [Front Teleconverter Lens] | | | | | | |
| 1 | 98.00000 | 8.55057 | 1.516800 | 1.526703 | 1.514322 | 1.522384 |
| 2 | 458.80000 | 0.00000 | $n_1$ | $n_2$ | $n_3$ | $n_4$ |
| 3* | 458.80000 | 0.20000 | 1.000000 | | | |
| 4 | 94.92662 | 12.51787 | 1.497000 | 1.504510 | 1.495140 | 1.501230 |
| 5 | −218.68467 | 0.88109 | 1.000000 | | | |
| 6 | −222.63964 | 2.50000 | 1.846660 | 1.894190 | 1.836490 | 1.872100 |
| 7 | −1693.40650 | 40.92394 | 1.000000 | | | |
| 8 | −268.34918 | 4.87330 | 1.846660 | 1.894190 | 1.836490 | 1.872100 |
| 9 | −55.70895 | 2.00000 | 1.772500 | 1.791970 | 1.767800 | 1.783370 |
| 10 | 51.84267 | 5.55324 | 1.000000 | | | |
| [Imaging Lens] | | | | | | |
| 11 | 112.43514 | 1.30000 | 1.846660 | 1.894190 | 1.836490 | 1.872090 |
| 12 | 46.60400 | 4.10000 | 1.788000 | 1.808880 | 1.783000 | 1.799630 |
| 13 | −1133.28930 | 0.10000 | 1.000000 | | | |
| 14 | 33.85568 | 3.15000 | 1.497820 | 1.505265 | 1.495980 | 1.502013 |
| 15 | 95.74872 | 30.94475 | 1.000000 | | | |
| 16 | 108.30760 | 1.20000 | 1.804000 | 1.825700 | 1.798820 | 1.816080 |
| 17 | 10.00677 | 4.30000 | 1.000000 | | | |
| 18 | −29.02213 | 0.90000 | 1.729160 | 1.745700 | 1.725100 | 1.738440 |

TABLE 2-continued

| | | | | | | |
|---|---|---|---|---|---|---|
| 19 | 21.56970 | 1.70000 | 1.846660 | 1.894190 | 1.836490 | 1.872090 |
| 20 | 36.04176 | 0.70000 | 1.000000 | | | |
| 21 | 22.21302 | 2.10000 | 1.846660 | 1.894190 | 1.836490 | 1.872090 |
| 22 | 133.93904 | 2.57196 | 1.000000 | | | |
| 23 | ∞ | 0.50000 | 1.000000 | | Aperture Stop | |
| 24 | 19.02855 | 3.05000 | 1.497820 | 1.505265 | 1.495980 | 1.502013 |
| 25 | −26.30218 | 0.20000 | 1.000000 | | | |
| 26 | 14.46962 | 4.90000 | 1.757000 | 1.776870 | 1.752230 | 1.768060 |
| 27 | 43.28420 | 0.75000 | 1.000000 | | | |
| 28 | −27.13969 | 0.90000 | 1.688930 | 1.717970 | 1.682500 | 1.704660 |
| 29 | 15.23852 | 1.40850 | 1.000000 | | | |
| 30 | 28.73630 | 0.90000 | 1.834810 | 1.859530 | 1.828970 | 1.848510 |
| 31 | 10.13030 | 3.85000 | 1.518230 | 1.529150 | 1.515560 | 1.524350 |
| 32 | −21.21893 | 24.45608 | 1.000000 | | | |
| 33 | 27.67335 | 3.00000 | 1.804000 | 1.825700 | 1.798820 | 1.816080 |
| 34 | −78.34600 | 1.00000 | 1.846660 | 1.894190 | 1.836490 | 1.872090 |
| 35 | 103.67959 | 5.56357 | 1.000000 | | | |
| 36 | ∞ | 2.76000 | 1.516330 | 1.526210 | 1.513860 | 1.521900 |
| 37 | ∞ | 2.47000 | 1.000000 | | | |
| 38 | ∞ | 0.50000 | 1.516330 | 1.526210 | 1.513860 | 1.521900 |
| 39 | ∞ | 1.27448 | 1.000000 | | | |

[Data of Diffractive Optical Element]
Surface Number: 2

$n(d) = 10001.0000 = n_1$   $n(g) = 7418.6853 = n_2$
$n(C) = 11170.4255 = n_3$   $n(F) = 8274.7311 = n_4$

[Aspherical Surface Data]
Surface Number: 3

$\kappa = 1.0000$   $C_2 = -2.5000E-09$
$C_4 = -1.0000E-13$   $C_6 = 0.0000E+00$
$C_8 = 0.0000E+00$   $C_{10} = 0.0000E+00$

[Values for Conditional Expressions]

$fF = 118.85445$
$fd = 236.45959$
$\phi F = 67.39$
$\phi R = 28.60$
$Ps = -0.001523$
$Pd = -0.001076$
$DFR = 40.92394$
$L = 72.44676$ Afocal Magnification $M = 1.999$ (1) $\phi F/\phi R = 2.35629$
(2) $|Pd|/Ps = -0.70650$
(3) $\phi R/fd = 0.12095$
(4) $fF/DFR = 2.90428$
(5) $fd/L = 3.26399$
(6) $nd = 1.77250$ As shown above, Example 1 satisfies all conditional expressions (1), (2), (3), (4), (5), and (6). The light ray passing through the center of the aperture stop P8 among light rays reaching the maximum image height is defined as the principal ray. In Example 1, the incident angle that is the angle between the principal ray and the surface normal becomes minimum at surface number 2 (3.79470°). Accordingly, the diffractive optical surface Gf is formed on this surface (lens L101 is the diffractive optical element.)

Figure 4:
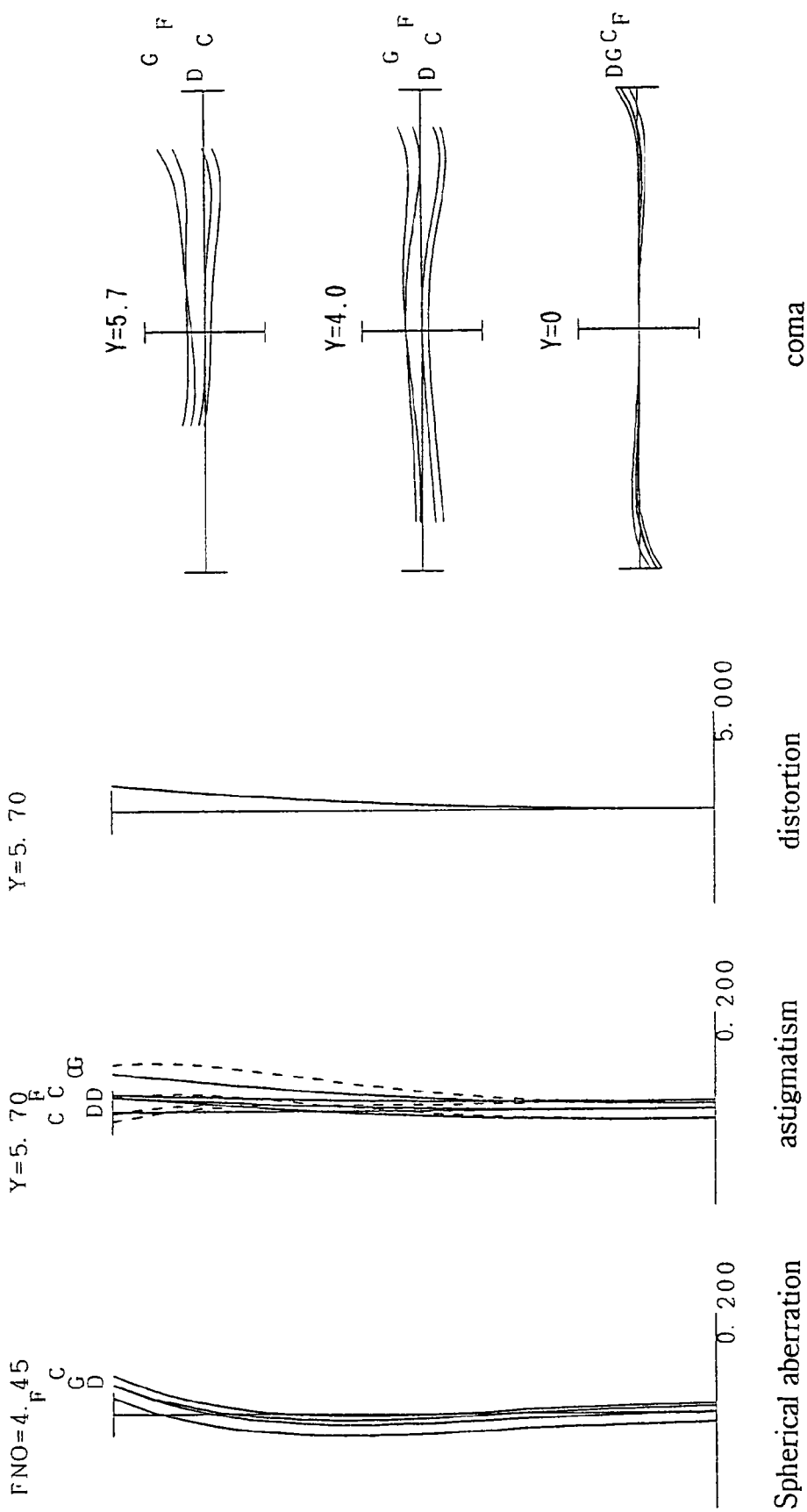
FIG. 4 graphically shows various aberrations of the combined optical system according to Example 1 of the present invention.

FIG. 4 graphically shows various aberrations of the combined optical system according to Example 1 of the present invention. In graphs for various aberrations, FNO denotes the f-number. Y denotes an image height. D denotes d-line, G denotes g-line, C denotes C-line, and F denotes F-line. In the diagrams showing spherical aberration, FNO denotes f-number with respect to the maximum aperture. In the diagrams showing astigmatism and distortion, Y denotes the maximum image height. In the diagrams showing coma, Y denotes each image height. In the diagrams showing astigmatism, a solid line indicates a sagittal image plane and a broken line indicates a meridional image plane. The explanation regarding aberration graphs is the same in the following Example.

As is apparent from the respective graphs, the combined optical system (the front teleconverter lens system TC and the imaging lens ML) according to Example 1 shows superb optical performance as a result of good corrections to various aberrations as a whole.

Example 2

Figure 6:
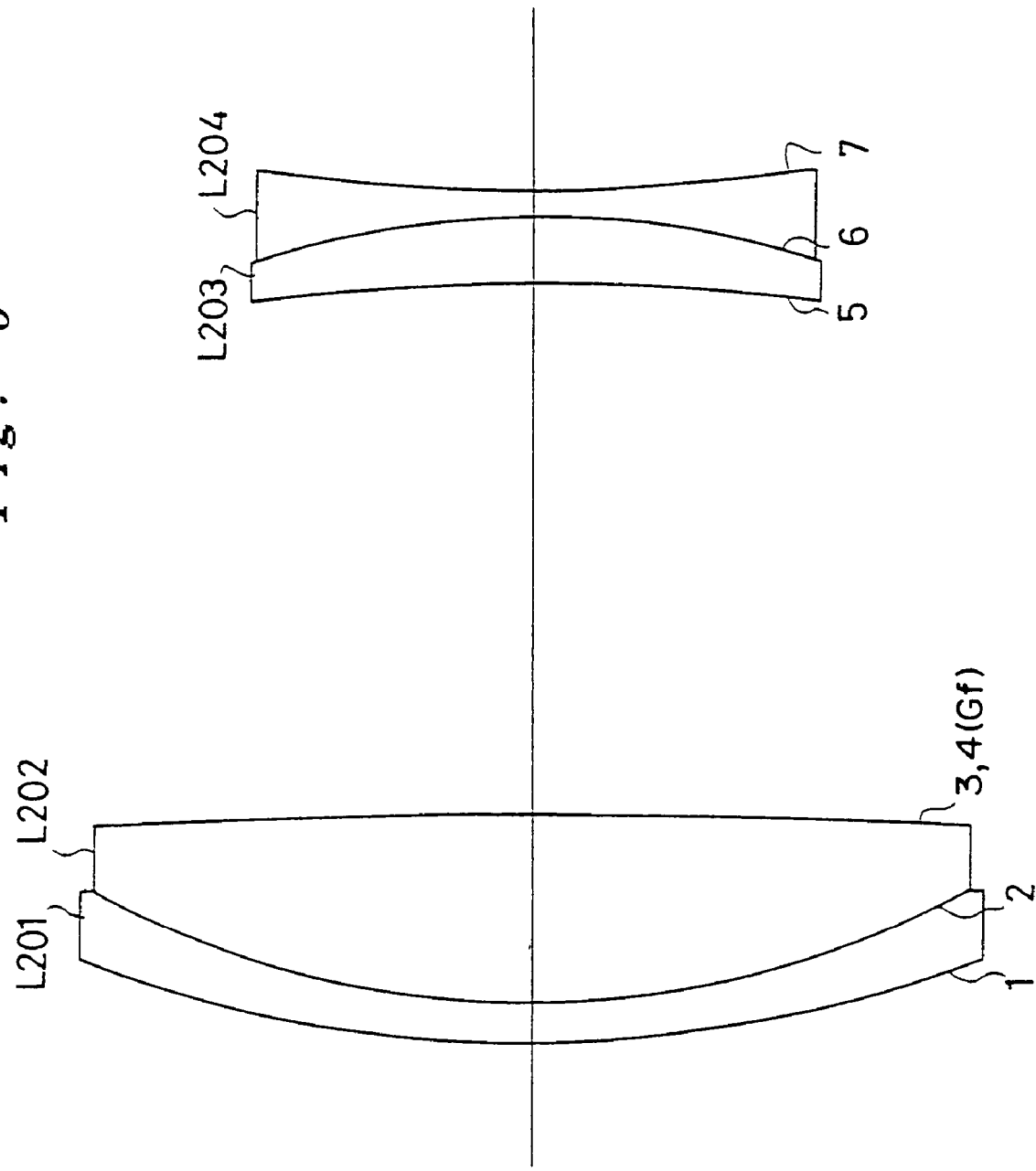
FIG. 6 is a diagram showing the front teleconverter lens system of the combined optical system according to Example 2 of the present invention.

FIG. 5 is a diagram showing a combined optical system constructed by a front teleconverter lens system combined with an imaging lens according to Example 2 of the present invention. FIG. 6 is a diagram showing the front teleconverter lens system of the combined optical system. As shown in FIGS. 5 and 6, the front teleconverter lens system TC according to Example 2 is composed of a first lens group FL having positive refractive power and a second lens group RL having negative refractive power. The first lens group FL is composed of a cemented positive lens constructed by, in order from the object, a negative meniscus lens L201 having a convex surface facing to the object cemented with a biconvex positive lens L202 on the image side surface of which a diffractive optical surface is formed. The second lens group RL is composed of a cemented negative lens constructed by, in order from the object, a positive meniscus lens L203 having a concave surface facing to the object cemented with a biconcave negative lens L204. The image side surface (concave surface) of the negative meniscus lens L201 and the object side surface (convex surface) of the biconvex lens L202 form a pair of a convex surface and a concave surface adjacent with each other with cement there between. The imaging lens ML is the same as Example 1 (see FIG. 3).

Various values associated with Example 2 are listed in Table 3. The left most column of [Lens Data] in Table 3 is the surface number. Surface number 1 through 7 in Table 3 relate to the front teleconverter lens system TC corresponding to each reference number 1 through 7 in FIG. 6. The imaging lens ML is the same as Example 1, so the duplicated explanation regarding notation is abbreviated.

In Example 2, surface numbers 3 and 4 of the front teleconverter lens system TC correspond to diffractive optical surfaces Gf. Accordingly, the lens L202 is the lens on which diffractive optical surface is formed (diffractive optical element). The glass material of the lens L202 on which diffractive optical surface is formed has Abbe number of 26.3. The most object side lens surface of the first lens group FL corresponds to the object side surface (surface number 1) of the lens L201 and the effective diameter of the surface corresponds to $\phi F$ in conditional expression (1). The most image side lens surface of the second lens group RL corresponds to the image side surface (surface number 7) of the lens L204 and the effective diameter of the surface corresponds to $\phi R$ in conditional expressions (1) and (3).

TABLE 3

[Front Teleconverter Lens]

| | r | d | n(d) | n(g) | n(C) | n(F) |
|---|---|---|---|---|---|---|
| 1 | 69.68718 | 2.50000 | 1.784700 | 1.824280 | 1.776130 | 1.805970 |
| 2 | 49.99323 | 12.30000 | 1.539960 | 1.551220 | 1.537190 | 1.546270 |
| 3* | −374.65414 | 0.00000 | $n_1$ | $n_2$ | $n_3$ | $n_4$ |
| 4 | −374.65414 | 33.30000 | 1.000000 | | | |
| 5 | −115.96368 | 4.00000 | 1.805180 | 1.847290 | 1.796110 | 1.827770 |
| 6 | −53.52406 | 2.00000 | 1.734000 | 1.751760 | 1.729680 | 1.743940 |
| 7 | 117.34088 | 3.90000 | 1.000000 | | | |

[Diffractive Optical Element]
Surface Number: 3 n(d) = 10001.0000 = $n_1$     n(g) = 7418.6853 = $n_2$
n(C) = 11170.4255 = $n_3$     n(F) = 8274.7311 = $n_4$

[Aspherical Surface Data]
Surface Number: 3

κ = 1.0000                    $C_2$ = 2.77430E−09
$C_4$ = 0.00000E+00           $C_6$ = 0.00000E+00
$C_8$ = 0.00000E+00           $C_{10}$ = 0.00000E+00

[Values for Conditional Expressions]

fF = 127.58094
fd = 127.58094
$\phi F$ = 51.22
$\phi R$ = 28.70
Ps = −0.004895
Pd = 0.001497
DFR = 33.3
L = 54.1

Afocal Magnification M = 1.515

(1) $\phi F/\phi R$ = 1.78467
(2) |Pd|/Ps = −0.30582
(3) $\phi R$/fd = 0.22496
(4) fF/DFR = 3.83126
(5) fd/L = 2.35824
(6) nd = 1.73400

As shown above, Example 2 satisfies all conditional expressions (1), (2), (3), (4), (5), and (6). The light ray passing through the center of the aperture stop P8 among light rays reaching the maximum image height is defined as the principal ray. In Example 1, the incident angle that is the angle between the principal ray and the surface normal becomes minimum at surface number 3 (9.96842°). Accordingly, the diffractive optical surface Gf is formed on this surface (lens L202 is the diffractive optical element.)

Figure 7:
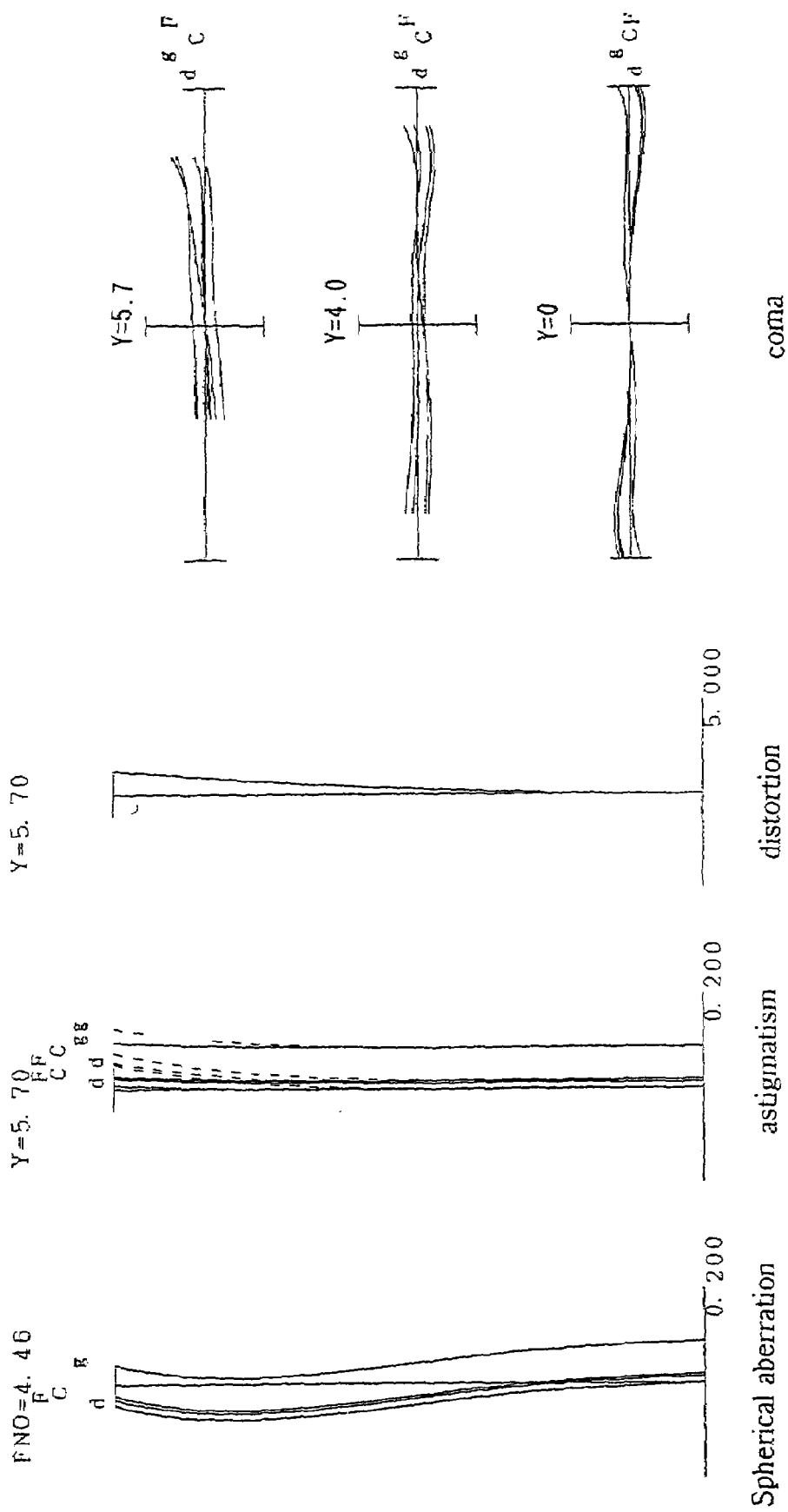
FIG. 7 graphically shows various aberrations of the combined optical system according to Example 2 of the present invention.

FIG. 7 graphically shows various aberrations of the combined optical system according to Example 2 of the present invention. As is apparent from the respective graphs, the combined optical system (the front teleconverter lens system TC and the imaging lens ML) according to Example 2 shows superb optical performance as a result of good corrections to various aberrations as a whole.

As is understood from the above-described Examples, the front teleconverter lens system according to the invention has superb optical performance with less production of aberration in spite of its compactness. Accordingly, when the front teleconverter lens system is attached to the object side of a digital still camera, for example, sufficient telescopic function can be obtained. By the way, in the aforementioned Examples, although the diffractive optical surface Gf is formed on a lens composing the first lens group F1, it may be formed on a lens composing the second lens group RL. In the above-described Examples, although only one diffractive optical surface is formed on a lens surface composing the front teleconverter lens system, this is only one example of the present invention, so the diffractive optical surface may be formed on a plurality of lens surfaces.

As described above, the front teleconverter lens system according to the present invention can obtain superb optical performance with less production of aberration in spite of its compactness.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. The front teleconverter lens system having three lenses or more, and an afocal magnification, upon attaching to an imaging lens, of 1.4 or more, and forming an afocal optical system;
    the front teleconverter lens system comprising, in order from an object:
    a first lens group having positive refractive power; and
    a second lens group having negative refractive power;
    a diffractive optical surface being arranged in at least one of the first lens group and the second lens group; and
    wherein the following conditional expression is satisfied:

$1.2 < \phi F/\phi R < 10$ where $\phi F$ denotes the effective diameter of the most object side lens surface of the first lens group, and $\phi R$ denotes the effective diameter of the most image side lens surface of the second lens group;
    wherein an incident angle of the principal ray passing through the maximum image height to the diffractive optical surface is 15 degrees or less.

2. The front teleconverter lens system according to claim 1, wherein
    the first lens group includes at least one pair of a convex surface and a concave surface adjacent with each other and the following conditional expression is satisfied:

$-3.0 < Pd/Ps < -0.05$ where Ps denotes a combined refractive power of the convex surface and the concave surface of the pair, and Pd denotes a refractive power of the diffractive optical surface.

3. The front teleconverter lens system according to claim 2, wherein
    the pair of a convex surface and a concave surface adjacent with each other have an air space there between.

4. The front teleconverter lens system according to claim 3, wherein
    the first lens group has a biconvex lens and at least one negative lens, and
    the second lens group has a biconcave lens at the most image side, and wherein
    the following conditional expression is satisfied:

$0.03 < \phi R/fd < 1.0$ where fd denotes the focal length of a lens on which the diffractive optical surface is formed.

5. The front teleconverter lens system according to claim 4, wherein
    the diffractive optical surface is arranged on one of the lens surfaces in the first lens group, and the following conditional expression is satisfied:

$1.0 < fF/DFR < 10.0$ where fF denotes the focal length of the first lens group, and DFR denotes a distance along the optical axis between the first lens group and the second lens group.

6. The front teleconverter lens system according to claim 5, wherein
    the following conditional expression is satisfied:

$1.0 < fd/L < 10.0$ where fd denotes the focal length of a lens on which the diffractive optical surface is formed, and L denotes a distance between the most object side lens surface of the first lens group and the most image side lens surface of the second lens group.

7. The front teleconverter lens system according to claim 2, wherein
    the pair of a convex surface and a concave surface adjacent with each other form a single cemented surface.

8. The front teleconverter lens system according to claim 7, wherein
    the first lens group has a biconvex lens and at least one negative lens, and
    the second lens group has a biconcave lens at the most image side, and wherein
    the following conditional expression is satisfied:

$0.03 < \phi R/fd < 1.0$ where fd denotes the focal length of a lens on which the diffractive optical surface is formed.

9. The front teleconverter lens system according to claim 8, wherein
    the diffractive optical surface is arranged on one of the lens surface in the first lens group, and
    the following conditional expression is satisfied:

$1.0 < fF/DFR < 10.0$ where fF denotes the focal length of the first lens group, and DFR denotes a distance along the optical axis between the first lens group and the second lens group.

10. The front teleconverter lens system according to claim 9, wherein
    the following conditional expression is satisfied:

$1.0 < fd/L < 10.0$ where fd denotes the focal length of a lens on which the diffractive optical surface is formed, and L denotes a distance between the most object side lens surface of the first lens group and the most image side lens surface of the second lens group.

11. The front teleconverter lens system according to claim 2, wherein
the first lens group has a biconvex lens and at least one negative lens, and
the second lens group has a biconcave lens at the most image side, and wherein
the following conditional expression is satisfied:

$$0.03 < \phi R/fd < 1.0$$

where fd denotes the focal length of a lens on which the diffractive optical surface is formed.

12. The front teleconverter lens system according to claim 2, wherein
the diffractive optical surface is arranged on one of the lens surface in the first lens group, and the following conditional expression is satisfied:

$$1.0 < fF/DFR < 10.0$$

where fF denotes the focal length of the first lens group, and DFR denotes a distance along the optical axis between the first lens group and the second lens group.

13. The front teleconverter lens system according to claim 2, wherein
the following conditional expression is satisfied:

$$1.0 < fd/L < 10.0$$

where fd denotes the focal length of a lens on which the diffractive optical surface is formed, and L denotes a distance between the most object side lens surface of the first lens group and the most image side lens surface of the second lens group.

14. The front teleconverter lens system according to claim 1, wherein
the first lens group has a biconvex lens and at least one negative lens, and
the second lens group has a biconcave lens at the most image side, and wherein
the following conditional expression is satisfied:

$$0.03 < \phi R/fd < 1.0$$

where fd denotes the focal length of a lens on which the diffractive optical surface is formed.

15. The front teleconverter lens system according to claim 14, wherein
the diffractive optical surface is arranged on one of the lens surface in the first lens group, and the following conditional expression is satisfied:

$$1.0 < fF/DFR < 10.0$$

where fF denotes the focal length of the first lens group, and DFR denotes a distance along the optical axis between the first lens group and the second lens group.

16. The front teleconverter lens system according to claim 1, wherein
the diffractive optical surface is arranged on one of the lens surface in the first lens group, and the following conditional expression is satisfied:

$$1.0 < fF/DFR < 10.0$$

where fF denotes the focal length of the first lens group, and DFR denotes a distance along the optical axis between the first lens group and the second lens group.

17. The front teleconverter lens system according to claim 1, wherein
the following conditional expression is satisfied:

$$1.0 < fd/L < 10.0$$

where fd denotes the focal length of a lens on which the diffractive optical surface is formed, and L denotes a distance between the most object side lens surface of the first lens group and the most image side lens surface of the second lens group.

18. A front teleconverter lens system having three lenses or more, and an afocal magnification, upon attaching to an imaging lens, of 1.4 or more, and forming an afocal optical system;
the front teleconverter lens system comprising, in order from an object:
a first lens group having positive refractive power; and
a second lens group having negative refractive power;
a diffractive optical surface being arranged in at least one of the first lens group and the second lens group; and
wherein the following conditional expression is satisfied:

$$1.2 < \phi F/\phi R < 10$$

where $\phi F$ denotes the effective diameter of the most object side lens surface of the first lens group, and $\phi R$ denotes the effective diameter of the most image side lens surface of the second lens group;
wherein the first lens group has a biconvex lens and at least one negative lens, and
the second lens group has a biconcave lens at the most image side, and wherein
the following conditional expression is satisfied:

$$0.03 < \phi R/fd < 1.0$$

where fd denotes the focal length of a lens on which the diffractive optical surface is formed.

19. The front teleconverter lens system according to claim 18, wherein
the diffractive optical surface is arranged on one of the lens surface in the first lens group, and the following conditional expression is satisfied:

$$1.0 < fF/DFR < 10.0$$

where fF denotes the focal length of the first lens group, and DFR denotes a distance along the optical axis between the first lens group and the second lens group.

20. The front teleconverter lens system according to claim 18, wherein
the following conditional expression is satisfied:

$$1.0 < fd/L < 10.0$$

where fd denotes the focal length of a lens on which the diffractive optical surface is formed, and L denotes a distance between the most object side lens surface of the first lens group and the most image side lens surface of the second lens group.

21. A front teleconverter lens system having three lenses or more, and an afocal magnification, upon attaching to an imaging lens, of 1.4 or more, and forming an afocal optical system;
the front teleconverter lens system comprising, in order from an object:
a first lens group having positive refractive power; and
a second lens group having negative refractive power;
a diffractive optical surface being arranged in at least one of the first lens group and the second lens group;

the first lens group comprising at least one pair of a convex surface and a concave surface adjacent with each other; and the following conditional expression being satisfied:

$-3.0 < |Pd|/Ps < -0.05$ where Ps denotes a combined refractive power of the convex surface and the concave surface of the pair, and Pd denotes a refractive power of the diffractive optical surface, wherein the first lens group has a biconvex lens and at least one negative lens, and the second lens group has a biconcave lens at the most image side, and wherein the following conditional expression is satisfied:

$0.03 < \phi R/fd < 1.0$ where fd denotes the focal length of a lens on which the diffractive optical surface is formed, and $\phi R$ denotes the effective diameter of the most image side lens surface of the second lens group.

22. A front teleconverter lens system having three lenses or more, and an afocal magnification, upon attaching to an imaging lens, of 1.4 or more, and forming an afocal optical system;

the front teleconverter lens system comprising, in order from an object:

a first lens group having positive refractive power; and a second lens group having negative refractive power;

a diffractive optical surface being arranged in at least one of the first lens group and the second lens group;

the first lens group comprising at least one pair of a convex surface and a concave surface adjacent with each other; and the following conditional expression being satisfied:

$-3.0 < |Pd|/Ps < -0.05$ where Ps denotes a combined refractive power of the convex surface and the concave surface of the pair, and Pd denotes a refractive power of the diffractive optical surface, wherein an incident angle of the principal ray passing through the maximum image height to the diffractive optical surface is 15 degrees or less.

23. A method for forming an image of an object and magnifying a total focal length of an imaging lens, comprising:

combining, with the imaging lens, a lens system having three lenses or more and including, in order from the object, a first lens group having positive refractive power and a second lens group having negative refractive power, with a diffractive optical surface being arranged in at least one of the first lens group and the second lens group, and an incident angle of the principal ray passing through the maximum image height to the diffractive optical surface being 15 degrees or less;

the lens system also satisfying the following conditional expression:

$1.2 < \phi F/\phi R < 10$ wherein $\phi F$ denotes the effective diameter of the most object side lens surface of the first lens group, and $\phi R$ denotes the effective diameter of the most image side lens surface of the second lens group.

24. The method according to claim 23, wherein the first lens group includes at least one pair of a convex surface and a concave surface adjacent to each other, and the following conditional expression is satisfied:

$-3.0 < |Pd|/Ps < -0.05$ where Ps denotes a combined refractive power of the convex surface and the concave surface of the pair, and Pd denotes a refractive power of the diffractive optical surface.

25. A method for forming an image of an object and magnifying a total focal length of an imaging lens, comprising:

combining, with the imaging lens, a lens system having three lenses or more and including, in order from the object, a first lens group having positive refractive power and a second lens group having negative refractive power, with a diffractive optical surface being arranged in at least one of the first lens group and the second lens group, the first lens group having a biconvex lens and at least one negative lens, and the second lens group having a biconcave lens at the most image side;

the lens system also satisfying the following conditional expressions:

$1.2 < \phi F/\phi R < 10$ $0.03 < \phi R/fd < 1.0$ where $\phi F$ denotes the effective diameter of the most object side lens surface of the first lens group, $\phi R$ denotes the effective diameter of the most image side lens surface of the second lens group, and fd denotes the focal length of a lens on which the diffractive optical surface is formed.

26. The method according to claim 25, wherein the first lens group includes at least one pair of a convex surface and a concave surface adjacent to each other, and the following conditional expression is satisfied:

$-3.0 < |Pd|/Ps < -0.05$ wherein Ps denotes a combined refractive power of the convex surface and the concave surface of the pair, and Pd denotes a refractive power of the diffractive optical surface.

* * * * *